United States Patent
Rekimoto

[11] Patent Number: 6,020,891
[45] Date of Patent: Feb. 1, 2000

[54] APPARATUS FOR DISPLAYING THREE-DIMENSIONAL VIRTUAL OBJECT AND METHOD OF DISPLAYING THE SAME

[75] Inventor: Junichi Rekimoto, Tokyo, Japan

[73] Assignee: Sony Corporation, Tokyo, Japan

[21] Appl. No.: 08/902,510

[22] Filed: Jul. 29, 1997

[30] Foreign Application Priority Data

Aug. 5, 1996  [JP]  Japan ................... P08-205611

[51] Int. Cl.[7] .................................................. G06T 17/40
[52] U.S. Cl. .................. 345/419; 345/435; 345/433; 345/355; 345/157
[58] Field of Search ............................. 345/419, 435, 345/355, 433, 157

[56] References Cited

U.S. PATENT DOCUMENTS

| | | | |
|---|---|---|---|
| 4,970,666 | 11/1990 | Welsh et al. ........................ | 364/522 |
| 5,359,703 | 10/1994 | Robertson et al. .................. | 345/419 |
| 5,590,268 | 12/1996 | Doi et al. ............................ | 395/326 |
| 5,684,943 | 11/1997 | Abraham et al. ................... | 345/473 |
| 5,706,419 | 1/1998 | Matsugu et al. .................... | 345/435 |

OTHER PUBLICATIONS

Yoshikawa et al., "Construction of Virtual World Using Dynamics Modules and Interaction Modules", IEEE, pp. 2358–2364, Apr. 1996.

*Primary Examiner*—Mark R. Powell
*Assistant Examiner*—Motilewa Good-Johnson
*Attorney, Agent, or Firm*—Limbach & Limbach L.L.P.

[57] ABSTRACT

A table and an apparatus of the other party as a picture in the actual world are displayed on a picture plane of a portable display, a three-dimensional virtual object generated by computer graphics and so on is displayed on the table, and the shade thereof is displayed on the table. With this, even in the midst of a work in the actual world, it is possible to switch the work simply to a work in the virtual world only by shifting eyes to a picture plane of a portable display. Further, it is possible to grasp the position in the space of a three-dimensional virtual object easily by displaying the shade. It is made so that the work in the virtual world may be performed easily as described even while the work in the actual world is continued.

6 Claims, 7 Drawing Sheets

PRESS BUTTON THEREBY TO INSTRUCT MOVEMENT OF THREE-DIMENTIONAL OBJECT.

FIG. 4B

RELATIVE POSITIONAL RELATIONSHIP BETWEEN THE THREE-DIMENTIONAL OBJECT AND APPARATUS IS FIXED WHILE THE BUTTON IS PRESSED DOWN. A USER CAN POSITION THE THREE-DIMENTIONAL OBJECT AT OPTIONAL LOCATION IN THE SPACE BY MOVING A PORTABLE APPARATUS.

SHADE OF THREE-DIMENTIONAL OBJECT SERVES AS EFFECTIVE KEY IN GRASPING POSITION AT THAT TIME.

FIG. 4C

BUTTON IS RELEASED AND MOVEMENT OF THREE-DIMENTIONAL OBJECT IS DETERMINED.

MOLECULE

FIG. 9

ATOM

SHADE

APPARATUS FOR DISPLAYING THREE-DIMENSIONAL VIRTUAL OBJECT AND METHOD OF DISPLAYING THE SAME

BACKGROUND OF THE INVENTION

1. Field of the Invention

The present invention relates to an apparatus for displaying a three-dimensional virtual object and a method of displaying the same, and, for example, to an apparatus for displaying a three-dimensional virtual object and a method of displaying the same in which a three-dimensional virtual object is displayed as if it were in existence in the actual world.

2. Description of the Related Art

In a field of virtual reality (VR), it has been made in recent years so that a picture in the virtual world generated by means of a computer is displayed using a nontransparent head mounting type display, and it is possible to perform interaction with the virtual world using a glove type input device, a bodysuit type input device or the like for instance for the display. With this, it is possible to enjoy such an atmosphere that as if oneself is in existence in the virtual world that cannot be experienced normally.

However, since no picture of the actual world exists at all in a picture which can be seen through a display in the nontransparent head mounting type display as described above, there have been such subjects that one feels isolation strongly or gets tired easily. Further, when a work in the virtual world is interrupted and a work in the actual world is performed, it is required to remove the head mounting type display once, thus producing a subject of causing a trouble.

Therefore, the present applicant has previously proposed to display a picture in the virtual world on a transparent head mounting type display. With this, a user can observe pictures in the actual world existing practically on the other side of the head mounting type display and the virtual world displayed on the head mounting type display at the same time, and performing a predetermined work for the picture of the virtual world. For example, it is possible to display a picture of a computer as a picture of the virtual world, and to operate the computer with fingers. Since sensors for measuring positions are installed on fingers, positions of the fingers are computed, and buttons of the computer existing virtually at these positions are operated.

Since it is thus possible to look at the actual world and the virtual world at the same time, it is possible to perform the work in the virtual world without feeling isolation. Further, since it is possible to perform a predetermined work for the virtual world in a state based on the actual world, it is possible to perform the work in the actual world and the work in the virtual world in parallel with the head mounting type display as it is installed.

When the head mounting type display is installed and with the sensors as they are installed on fingers, however, there has been a problem that the work in the normal actual world is restricted. For example, when a head mounting type display is installed, a field of view is restricted to some extent, and excessive burden is applied to the head. Further, when the sensors are installed on fingers, a manual work becomes difficult to be performed sometimes.

SUMMARY OF THE INVENTION

The present invention has been made in view of such circumstances, and makes it possible to observe a picture of the virtual world simply, and to perform a work in the virtual world while continuing a work in the actual world.

An apparatus for displaying a three-dimensional virtual object according to claim 1 is provided with display means for displaying a predetermined picture, image pickup means installed with the image pickup direction set to a back direction of a display plane of the display means and picking up an image of an actual picture of a predetermined subject, coordinates measuring means for measuring three-dimensional space coordinates of the image pickup means for a predetermined reference plane, picture generating means for generating a picture of a predetermined virtual three-dimensional object based on the three-dimensional space coordinates for the reference plane of the image pickup means measured by the coordinates measuring means, and composite picture generating means for generating a composite picture in which a picture of a virtual three-dimensional object generated by the picture generating means is superimposed on a predetermined position of a background with the actual picture the image of which is picked up by means of the image pickup means as a background and based on three-dimensional space coordinates for a reference plane of the image pickup means measured by the coordinates measuring means, and the display means displays a composite picture.

A method of displaying a three-dimensional virtual object according to claim 6 is characterized in that an image of an actual picture of a predetermined subject is picked up with the image pickup direction set to a back direction of a display plane of display means, three-dimensional space coordinates of the image pickup means for a predetermined reference plane are measured, a picture of a predetermined virtual three-dimensional object is generated based on the measured three-dimensional space coordinates for the reference plane of the image pickup means, a composite picture in which a picture of a virtual three-dimensional object generated by the picture generating means is superimposed at a predetermined position of a background is generated with the actual picture the image of which has been picked up as a background and based on three-dimensional space coordinates for a reference plane of the image pickup means measured by the coordinates measuring means, and the composite picture is displayed on the display plane.

In an apparatus for displaying a three-dimensional virtual object according to claim 1, image pickup means is installed with the image pickup direction set to a back direction of a display plane of the display means for displaying a predetermined picture and picks up an image of an actual picture of a predetermined substance, the coordinates measuring means measures the three-dimensional space coordinates of the image pickup means for a predetermined reference plane, the picture generating means generates a picture of a predetermined virtual three-dimensional object based on the three-dimensional space coordinates for a reference plane of the image pickup means measured by the coordinates measuring means, the composite picture generating means generates a composite picture in which a picture of a virtual three-dimensional object generated by the picture generating means has been superimposed at a predetermined position of the background with an actual picture the image of which has been picked up by the image pickup means as a background and based on the three-dimensional space coordinates for a reference plane of the image pickup means measured by the coordinates measuring means, and the display means displays a composite picture.

In a method of displaying a three-dimensional virtual object according to claim 6, an image of an actual picture of a predetermined subject is picked up with the image pickup direction set to a back direction of a display plane of display means, three-dimensional space coordinates of the image pickup means for a predetermined reference plane are measured, a picture of a predetermined virtual three-dimensional object is generated based on the measured three-dimensional space coordinates for the reference plane of the image pickup means, a composite picture in which a picture of a virtual three-dimensional object generated by the picture generating means is superimposed at a predetermined position of a background is generated with the actual picture the image of which has been picked up as a background and based on three-dimensional space coordinates for a reference plane of the image pickup means measured by the coordinates measuring means, and the composite picture is displayed on the display plane.

DESCRIPTION OF THE PREFERRED EMBODIMENTS

Figure 1:
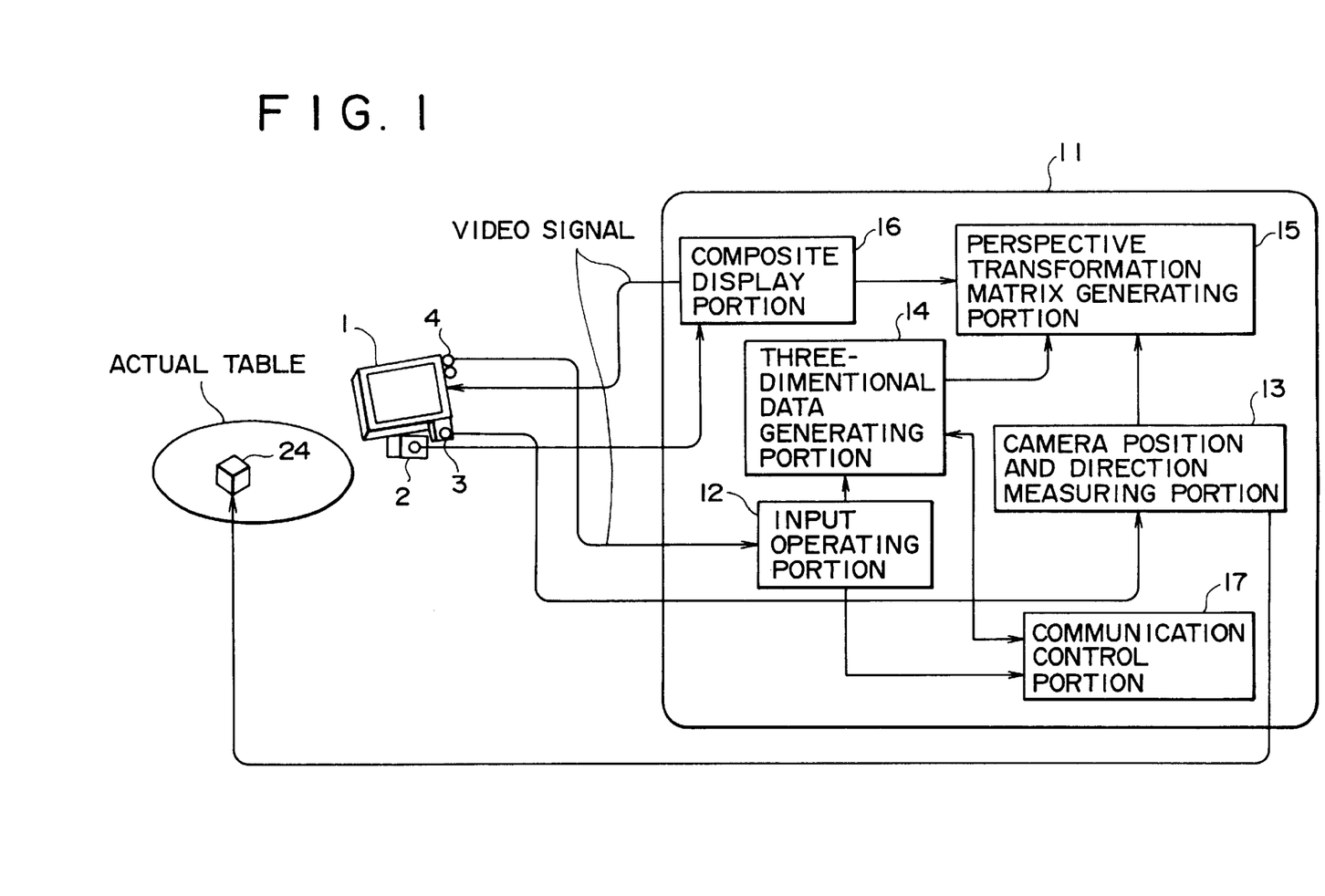
FIG. 1 is a block diagram showing a structural example of a display apparatus applied with the present invention.

FIG. 1 is a block diagram showing a structural example of a display apparatus applied with the present invention. A portable display 1 (display means) is composed of a liquid crystal display (LCD) or the like, and made to display predetermined pictures, letters, figures and so on. A video camera 2 (image pickup means) is fitted to the portable display 1 so that the image pickup direction is set toward a back direction of a picture of the picture portable display 1.

A three-dimensional position and direction sensor 3 (coordinates measuring means) is fitted fixedly to the portable display 1 or the video camera 2, and is made so as to measure the position, the gradient angle or the like of the portable display 1 and the video camera 2 with respect to a predetermined reference plane. For example, a top face of a table and so on can be adopted as the reference plane. Here, a case that the three-dimensional position and direction measuring device is fitted fixedly to the portable display 1 has been shown, but it is also possible to fit the three-dimensional position and direction sensor 3 fixedly to the video camera 2 (see FIG. 4 and FIG. 5).

A control button 4 (operating means) is operated when predetermined instructions are given so as to output a predetermined signal corresponding to the operation.

A processing apparatus 11 is made to generate a picture of a three-dimensional virtual object based on a signal from the control button 4 or positional data from the three-dimensional position and direction sensor 3, and superimposes the picture on a picture picked up by the video camera 2 and displays the picture on the portable display 1.

An input operating portion 12 constituting the processing apparatus 11 is made to receive a signal from the control button 4. A camera position and direction measuring portion 13 is made to measure the position and the image pickup direction of the video camera 2 on the reference plane so as to output positional data and directional data based on a position and direction signal supplied from the three-dimensional position and direction sensor.

A three-dimensional data generating portion 14 is made to store data (composed of shapes and colors) of a predetermined form model and output the data appropriately. A perspective transformation matrix generating portion 15 (picture generating means) is made to generate a matrix for perspective transformation, to perform perspective transformation of form model data of a predetermined form model outputted from the three-dimensional data generating portion 14 based on the positional data and the directional data outputted from the camera position and direction measuring portion 13, and to display these data in a predetermined size at a predetermined position of the portable display 1.

Further, a perspective transformation matrix generating portion 15 is made to generate a picture of the shade of the form model applied with perspective transformation so as to be positioned on the reference plane.

A composite display portion 16 (composite picture generating means) is made to compose a video signal supplied from the video camera 2 with a picture of a predetermined form model supplied from the perspective transformation matrix generating portion 15 and applied with perspective transformation and supply the composite picture to the portable display 1. A communication control portion 17 is made to supply operating data corresponding to a signal inputted from the input operating portion 12, form model data held by the three-dimensional data generating portion 14 and so on to another apparatus having a structure similar to that of the apparatus shown in FIG. 1 in accordance with communication procedure such as communication between processes now, and then to receive operating data and form model data outputted from an input operating portion of another apparatus.

As described above, the three-dimensional position and direction sensor 3 detects a position on the reference plane and the image pickup direction of the video camera 2, and the camera position and direction measuring portion 13 computes relative positions and postures (azimuth, elevation and roll) on three dimensions (x-, y- and z-axis) between the video camera 2 and a predetermined reference plane. As the three-dimensional position measuring apparatus 3 and the position and direction measuring portion 13, for example, an apparatus using supersonic waves which has been made marketable as Crystal EYES (trademark) of Stereo Graphics Company or an apparatus using magnetism made marketable by Polhemus Company as 3SPACE (trademark) may be applied.

Figure 2:
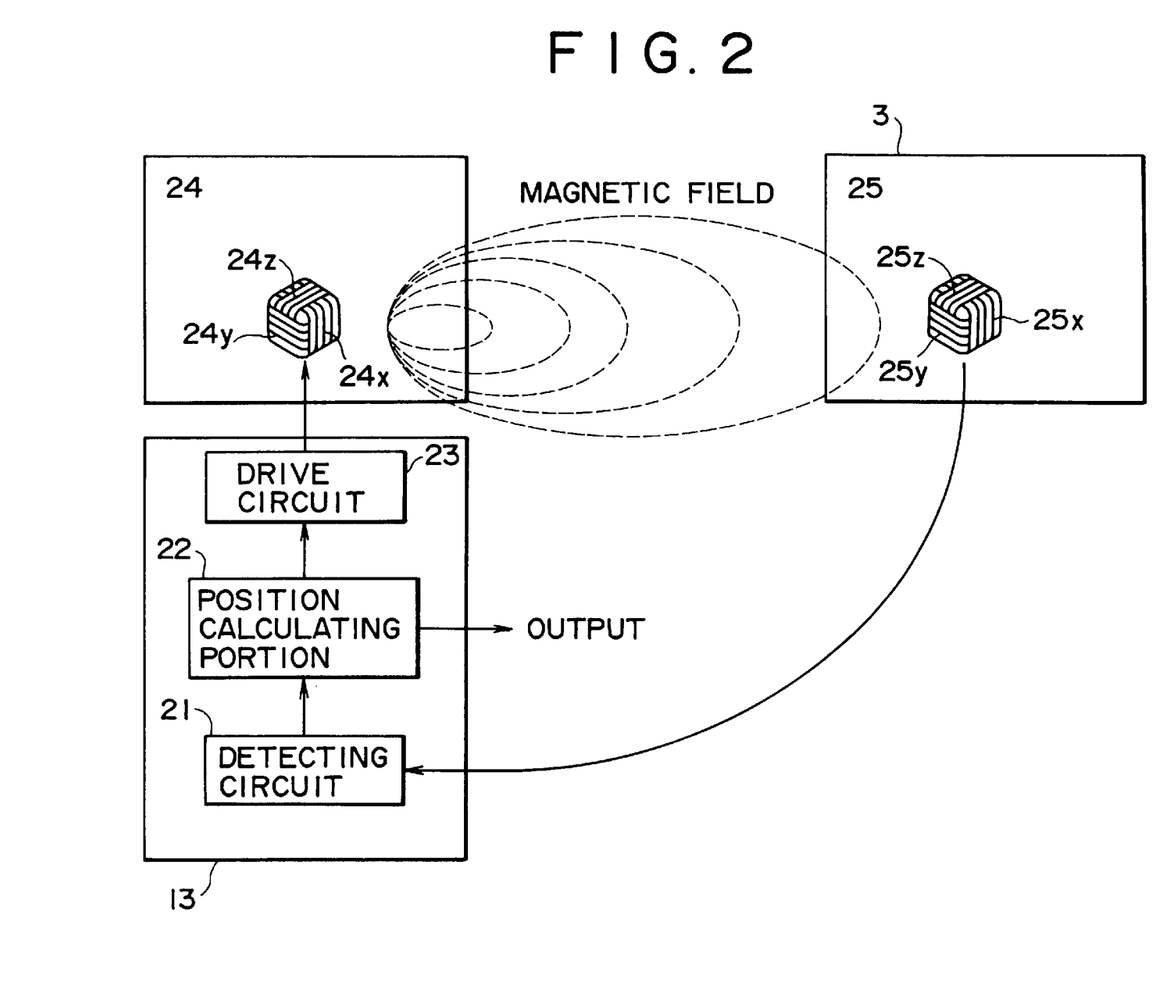
FIG. 2 is a block diagram showing a structural example of a three-dimensional coordinates measuring apparatus.

FIG. 2 shows a structural example of a three-dimensional coordinates measuring apparatus for detecting a position of a position sensor 25 (magnetic field detecting means) using magnetism. As shown in FIG. 2, the three-dimensional coordinates measuring apparatus has a source coil (orthogonal coils) 24 (magnetic field generating means).

This source coil 24 is composed of a coil 24x for generating a magnetic field in the x-axis direction, a coil 24y for generating a magnetic field in the y-axis direction and a coil 24z for generating a magnetic field in the z-axis direction. A position sensor 25 also includes a coil 25x for detecting a magnetic field in the x-axis direction, a coil 25y for detecting a magnetic field in the y-axis direction and a coil 25z for detecting a magnetic field in the z-axis direction.

A position calculating portion 22 (arithmetic means) of the three-dimensional coordinates measuring apparatus drives three coils of the source coil 24 through a drive circuit 23 in a time sharing manner, respectively. As a result, a magnetic field in the x-axis direction, a magnetic field in the y-axis direction and a magnetic field in the z-axis direction are generated successively. Respective coils of the position sensor 25 detect these magnetic fields in respective directions, and output the detected signals to a detecting circuit 21. The detecting circuit 21 supplies the detected signals to the position calculating portion 22. The position calculating portion 22 computes the detected signals supplied from the detecting circuit 21, and obtains the position and the posture on three dimensions with respect to the reference plane (the plane on which the source coil 24 is arranged) of the position sensor 25.

It is possible to apply the three-dimensional coordinates measuring apparatus shown in FIG. 2 to the camera position and direction measuring portion 13 shown in FIG. 1 for instance, to arrange the source coil 24 on a table which becomes the reference plane, and also to apply the position sensor 25 as the three-dimensional position and direction sensor 3. With this, it is possible to obtain the position and the posture on three dimensions of the portable display 1 with respect to the reference plane (the top face of the table).

Next, the operation thereof will be described. The video signal for the picture the image of which is picked up by the video camera 2 is supplied to the composite display portion 16 of the processing apparatus 11. Further, a position and direction signal corresponding to the position and the direction of the video camera 2 measured by means of the three-dimensional position and direction sensor 3 is supplied to the camera position and direction measuring portion 13. The camera position and direction measuring portion 13 obtains the position and the image pickup direction of the video camera 2 with respect to the reference plane by operation based on these measured data, and supplies positional data and directional data as the result of operation to the perspective transformation matrix generating portion 15.

When the control button 4 is operated and it is directed to display a predetermined form model by a user, the input operating portion 12 gives instructions to the three-dimensional data generating portion 14 to output predetermined form model data in accordance with the instructions from the control button 4. The three-dimensional data generating portion 14 supplies predetermined form model data instructed by the input operating portion 12 to the perspective transformation matrix generating portion 15. In this case, for example, it is assumed that form model data expressing the heart have been supplied to the perspective transformation matrix generating portion 15.

The perspective transformation matrix generating portion 15 generates a picture of a three-dimensional virtual object by perspective transformation of predetermined form model data supplied from the three-dimensional data generating portion 14 based on the positional data and the directional data outputted from the camera position and direction measuring portion 13 and supplies the picture to the composite display portion 16. Furthermore, the perspective transformation matrix generating portion 15 generates a picture of shade appearing on the reference plane (a table in this case) by the generated three-dimensional virtual object, and supplies the picture to the composite display portion 16.

The composite display portion 16 superimposes the picture of the three-dimensional virtual object supplied from the perspective transformation matrix generating portion 15 on the actual picture supplied from the video camera 2, and supplies the picture to the portable display 1.

Figure 3:
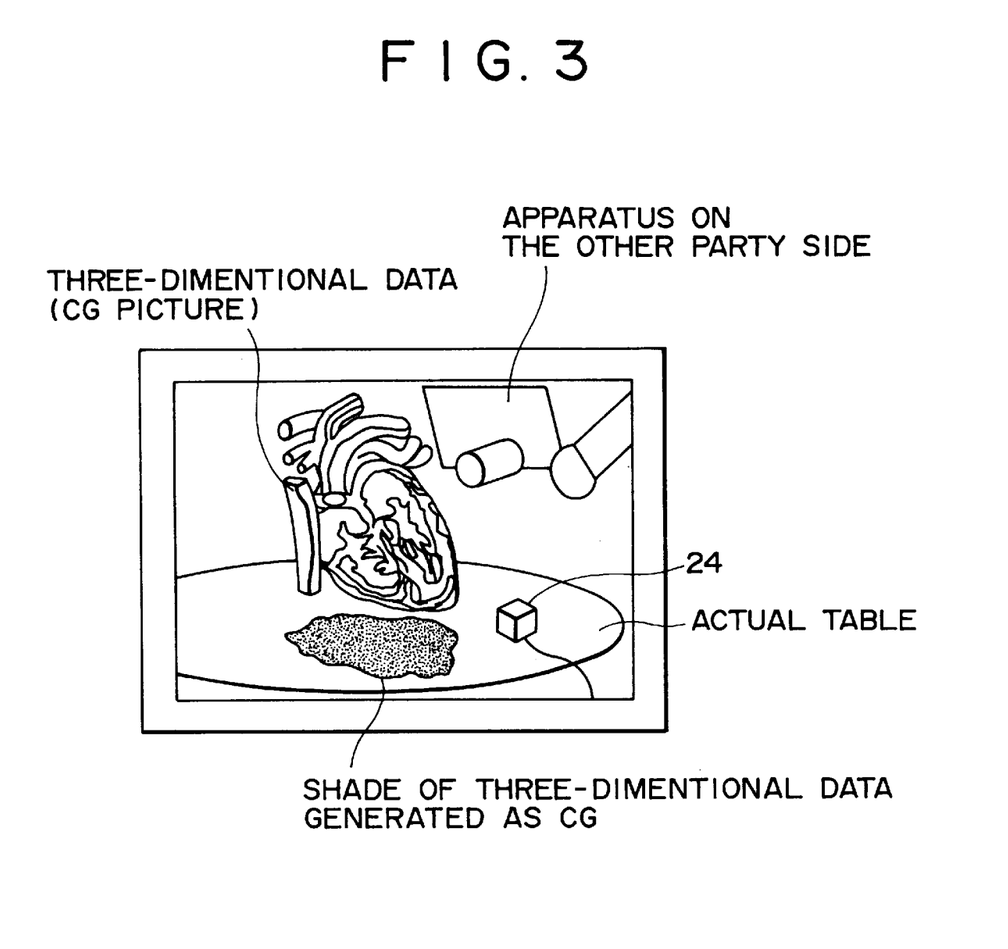
FIG. 3 is a drawing showing a display example of a picture in which a picture of a three-dimensional virtual object has been superimposed on a picture in the actual world.

FIG. 3 shows a picture thus displayed on the portable display 1. As shown in FIG. 3, an actual picture the image of which has been picked up by the video camera 2, i.e., in this case, a table as the reference plane, hands of the other party and the display apparatus are displayed, and a picture of the heart as a three-dimensional virtual object (a picture by means of computer graphics) is displayed above the table. Furthermore, a picture of the shade of the heart as a three-dimensional virtual object generated by a technique of computer graphics is displayed on the table.

Since an actual picture is displayed with the picture of a three-dimensional virtual object superimposed thereon on the portable display 1 as described above, a user can observe in a manner as if a three-dimensional virtual object were in existence in the actual world. Furthermore, it is possible to make such display that the shade of the three-dimensional virtual object is actually cast on the table by displaying a figure simulating the shade produced by the three-dimensional virtual object at a position corresponding to the surface of an actual floor or table. Accordingly, a user can grasp the position in the space of the three-dimensional virtual object more accurately from the relationship between the table and the shade.

Next, the operation in the case that the control button 4 is operated so as to move a three-dimensional virtual object virtually with respect to a reference plane (a table in this case) will be explained.

First, a user instructs movement of the three-dimensional virtual object displayed on the portable display 1 by operating a predetermined control button 4. A signal corresponding to the operation of the control button 4 is supplied to the input operating portion 12, and is supplied to the perspective transformation matrix generating portion 15 through the three-dimensional data generating portion 14.

While the predetermined control button 4 is being depressed, the relative positional relationship between the three-dimensional virtual object and the display apparatus is fixed irrespective of the movement of the display apparatus. Namely, the perspective transformation matrix generating portion 15 performs perspective transformation corresponding to the positional data and the directional data of the video camera 2 supplied from the camera position and direction measuring portion 13 so that the relative positional relationship between the three-dimensional virtual object and the display apparatus does not change.

Figure 4A:
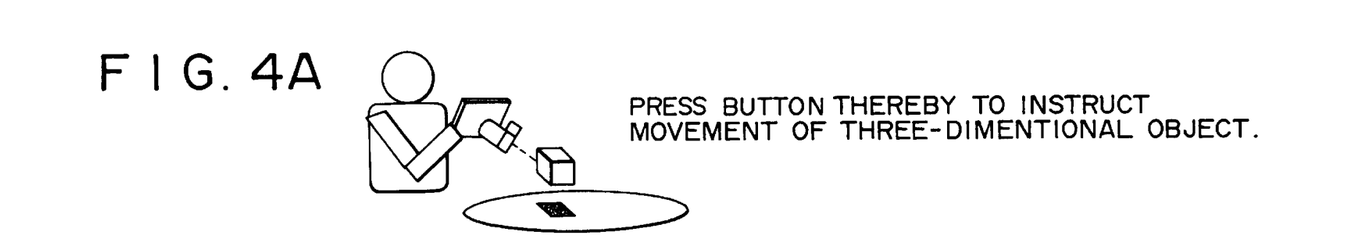
FIGS. 4A to 4C show drawings showing a state that a three-dimensional virtual object is grasped and moved.
Figure 4B:
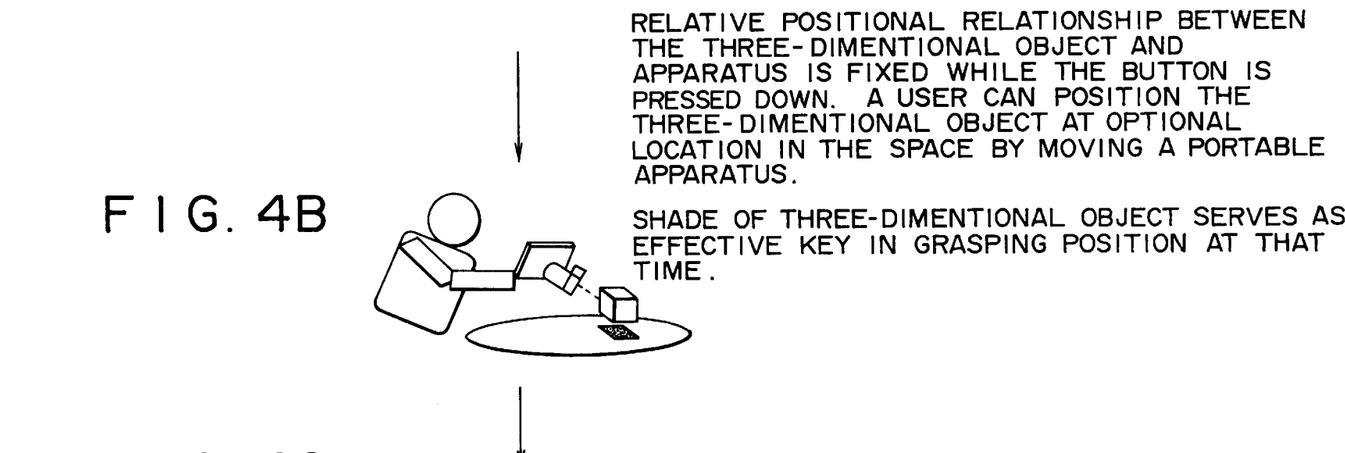

For example, as shown in FIG. 4A, when the display apparatus is moved toward the center of the table for instance after the control button 4 is depressed to instruct the start of movement operation under a state that the three-dimensional virtual object is displayed at almost the center of the table as the reference plane, the three-dimensional virtual object moves virtually from almost the center of the table toward the edge thereof as shown in FIG. 4B pursuant to the above. At that time, the relative positional relationship between the display apparatus and the three-dimensional virtual object does not change. Thus, it is possible to position the three-dimensional virtual object to an optional location in the space. At that time, the shade of the three-dimensional virtual object displayed on the table serves as a hot lead in grasping where is the three-dimensional virtual object at that movement.

Figure 4C:
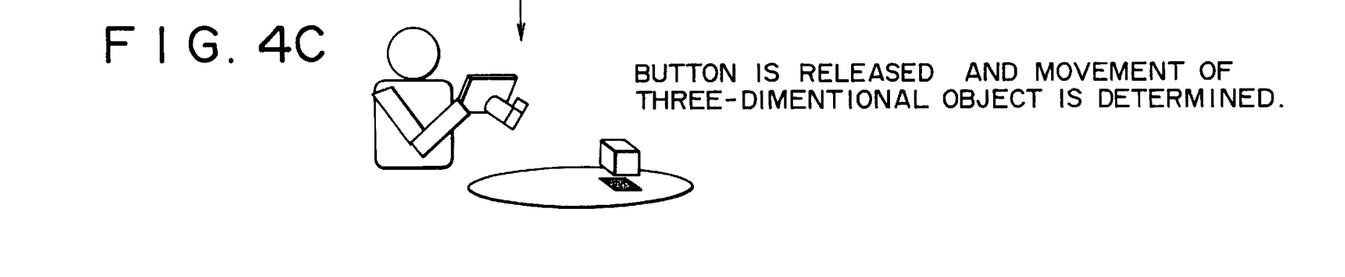

Next, when the control button 4 is released, the three-dimensional virtual object is brought into a state that the relative positional relationship with the reference plane (table) is fixed. With this, it is possible to settle the position in the space of the three-dimensional virtual object. Accordingly, as shown in FIG. 4C, when the display apparatus is moved this side after releasing the control button 4, the distance between the display apparatus and the three-dimensional virtual object becomes longer, and with this, the size of the three-dimensional virtual object displayed on the portable display becomes smaller.

Figure 5:
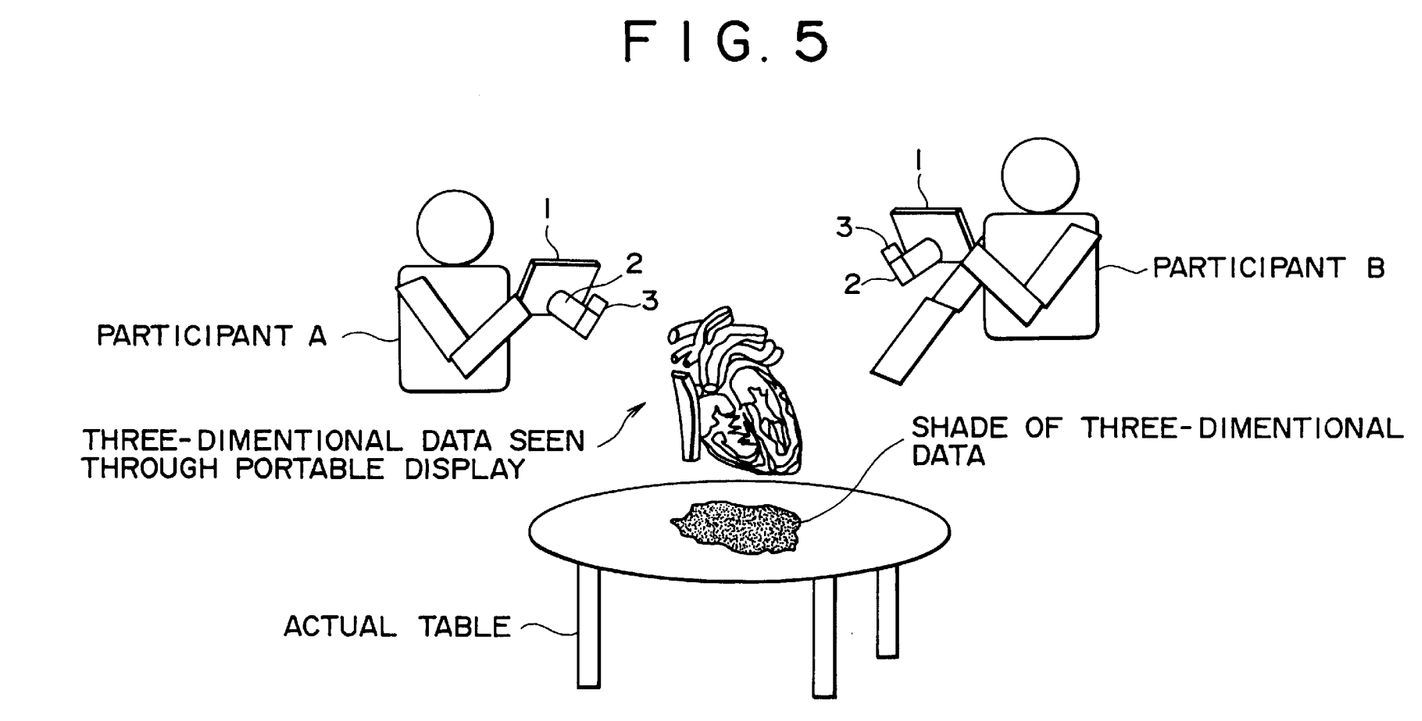
FIG. 5 is a drawing showing a state that a plurality of participants hold same three-dimensional data in common.

Now, the three-dimensional data (form model data) can be held in common among a plurality of display apparatus using communication means such as communication among processes. With this, as shown in FIG. 5, a plurality of participants who participate in a predetermined meeting can observe the same three-dimensional virtual object corresponding to the same form model data or move the same three-dimensional virtual object. At this time, the picture of the other participants photographed by the video camera 2 is displayed on the portable display 1 of the display apparatus belonging to respective participants in addition to the three-dimensional virtual object.

Namely, on the portable display 1 of a participant A, a table and a participant B are displayed as a picture of the background, the three-dimensional virtual object is displayed at the center of the table, and the shade thereof is displayed at a predetermined position on the table. Further, on the portable display 1 of a participant B, the table and the participant A are displayed as the picture of the background, the three-dimensional virtual object is displayed at the center of the table, and the shade thereof is displayed at a predetermined position on the table.

Figure 6:
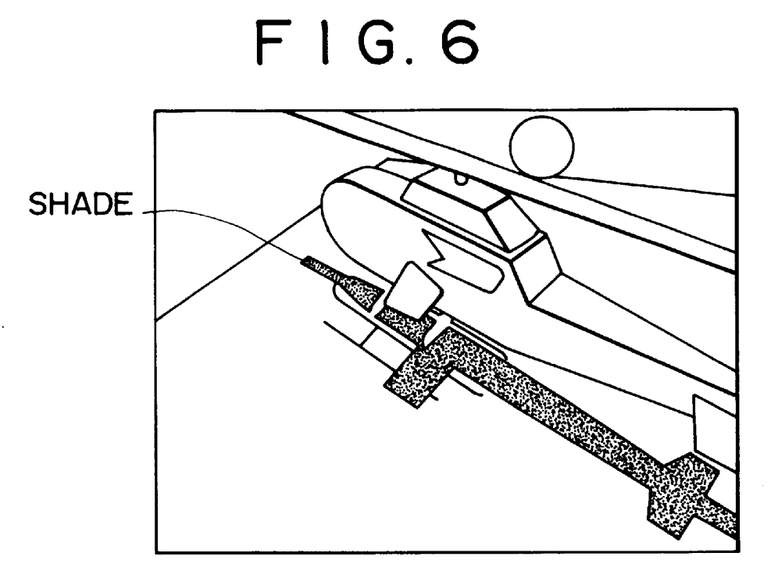
FIG. 6 is a drawing showing a display example when one operates while grasping a three-dimensional virtual object.

FIG. 6 shows the state that, for example, the participant A grasps the three-dimensional virtual object on the table displayed on the portable display 1, in this case, a helicopter displayed by computer graphics and moves it to a predetermined location. A sphere displayed at the upper part of the portable display 1 serves as a target for grasping the helicopter, and corresponds to human hands. Namely, it is made possible to grasp virtually a three-dimensional virtual object by bringing the target into contact with the predetermined three-dimensional virtual object on the picture plane of the portable display 1.

Figure 7:
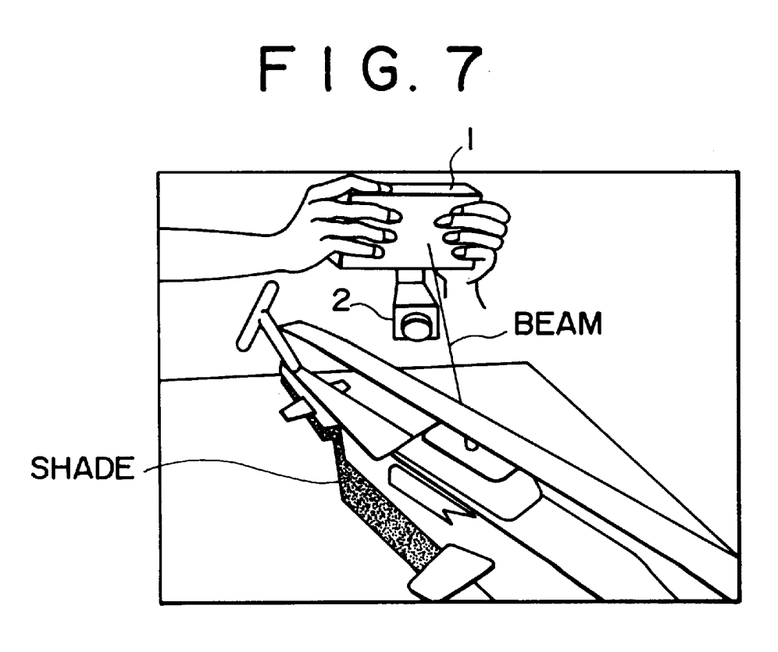
FIG. 7 is a drawing showing a display example when the other party operates while grasping a three-dimensional virtual object.

FIG. 7 shows a picture displayed on the display picture plane of the portable display 1 of the participant B when the participant A grasps the helicopter as a three-dimensional virtual object and moves it as shown in FIG. 6. Here, the participant A, the display apparatus held by the participant A and the table are displayed as an actual picture, and the helicopter as a three-dimensional virtual object is displayed on the table. Further, a predetermined beam is displayed between the display apparatus held by the participant A and the helicopter. This beam is shown for the purpose of showing that the participant A grasps the helicopter.

While the participant A moves the helicopter to a predetermined location, a predetermined beam is displayed from the display apparatus of the participant A to the helicopter, and, as the participant A moves the display apparatus, the helicopter and the beam move so that the relative positional relationship with the display apparatus held by the participant A does not change.

Since a picture in which a predetermined beam is radiated toward the three-dimensional virtual object from the display apparatus held by a participant when the participant grasps the three-dimensional virtual object is displayed, another participant can recognize who is grasping the three-dimensional virtual object.

Figure 8:
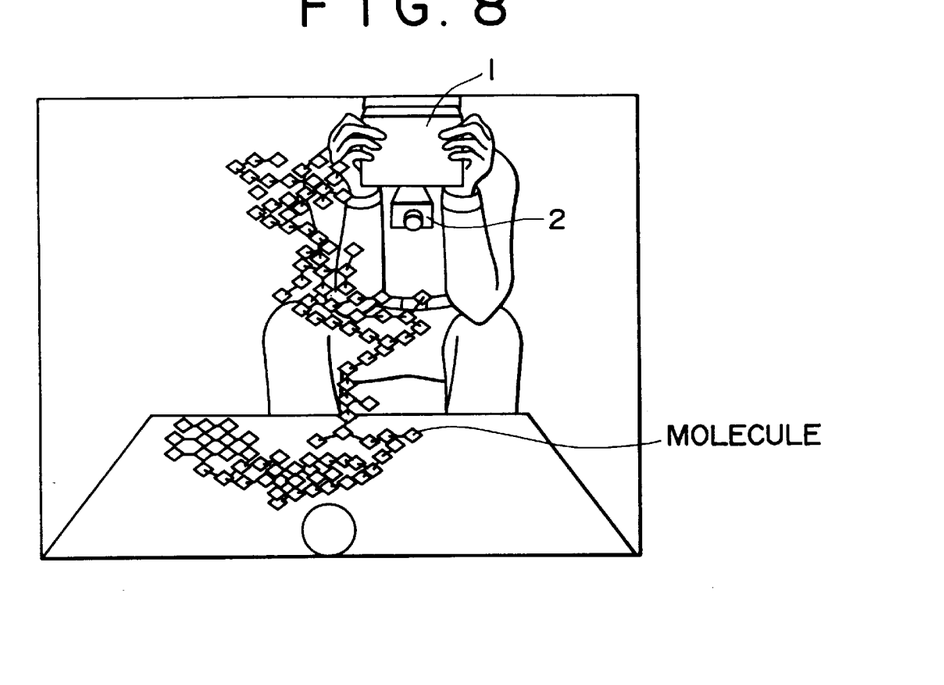
FIG. 8 is a drawing showing a display example when a molecular model is displayed as a three-dimensional virtual object.
Figure 9:
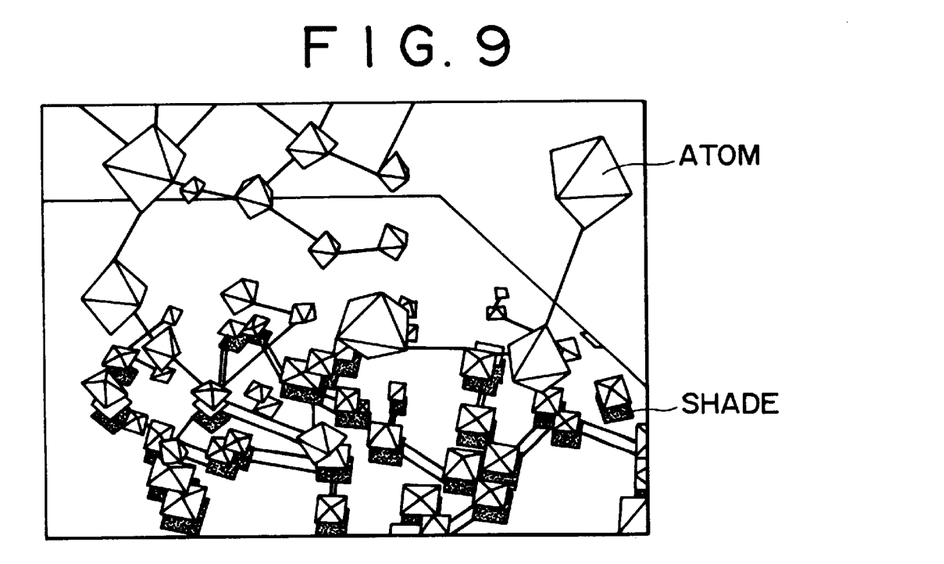
FIG. 9 is a drawing showing a display example when a display apparatus is brought close to a molecular model.

FIG. 8 shows a state that a predetermined molecular model is displayed and operated on the portable display. Here, when the portable display 1 is brought close to the molecular model in order to observe a detailed structure of a predetermined portion of the molecular model, atoms composing a predetermined portion of a molecular model is displayed with expansion in accordance with the distance that the portable display 1 is brought close to the molecular model as shown in FIG. 9. In such a manner, it is possible to display a predetermined portion of a three-dimensional virtual object which is an object of observation with expansion easily.

Besides, a case that the participants are two persons has been described in the above-mentioned embodiment, but it is also possible to share three-dimensional data in common similarly with respect to a case where there are a plurality of participants of three persons or more.

Besides, although a predetermined sphere or beam is displayed in order to show that a three-dimensional virtual object is grasped in the above-mentioned embodiment, they are not limited to a sphere or a beam, but it is also possible to display objects, figures and so on having predetermined forms other than the above.

Further, a case that a three-dimensional virtual object is moved has been described in the above-mentioned embodiment, but it is also possible to apply such operations as rotating a three-dimensional virtual object or altering a part of the form to the three-dimensional virtual object.

According to an apparatus for displaying a three-dimensional virtual object according to claim 1, and a method of displaying a three-dimensional virtual object according to claim 6, an image of an actual picture of a predetermined subject is picked up with the image pickup direction set to a back direction of a display plane of the display means, three-dimensional space coordinates of the image pickup means with respect to the predetermined reference plane are measured, a picture of a predetermined virtual three-dimensional object is generated based on measured three-dimensional space coordinates for the reference plane of the image pickup means, a composite picture in which a picture of a virtual three-dimensional object generated by the picture generating means is superimposed on a predetermined position of the background with an actual picture the image of which has been picked up as the background and based on three-dimensional space coordinates with respect to the reference plane of the image pickup means measured by the coordinates measuring means and displayed on the display plane of the display means. Accordingly, it becomes possible to observe a composite picture in which a picture of the virtual world is superimposed on a picture of the actual world simply and quickly, and to perform a work in the virtual world easily even while continuing a normal work in the actual world.

What is claimed is:

1. An apparatus for displaying a three-dimensional virtual object comprising:

display means for displaying a predetermined picture;

image pickup means installed with an image pickup direction set to a back direction of a display plane of said display means for picking up an image of an actual picture of a predetermined subject;

coordinates measuring means for measuring three-dimensional space coordinates of said image pickup means with respect to a predetermined reference plane;

picture generating means for generating a picture of a predetermined virtual three-dimensional object based on three-dimensional space coordinates for said reference plane of said image pickup means measured by said coordinates measuring means; and composite picture generating means for generating a composite picture in which a picture of a virtual three-dimensional object generated by said picture generating means with said actual picture the image of which has been picked up by said image pickup means as the background and based on said three-dimensional space coordinates for said reference plane of said image pickup means measured by said coordinates measuring means; wherein:

said display means displays said composite picture.

2. An apparatus for displaying a three-dimensional virtual object according to claim 1, wherein said coordinates measuring means is composed of magnetic field generating means arranged on said reference plane, magnetic field detecting means arranged in said image pickup means, and arithmetic means for computing said three-dimensional space coordinates based on the result of detection by said magnetic field detecting means.

3. An apparatus for displaying a three-dimensional virtual object according to claim 1, wherein said picture generating means generates a picture of a shadow of said virtual three-dimensional object on said reference plane.

4. An apparatus for displaying a three-dimensional virtual object according to claim 1, further comprising operating means for grasping said three-dimensional virtual object virtually and applying predetermined operation to said three-dimensional virtual object; wherein, when movement of said three-dimensional virtual object with respect to said reference plane is instructed by said operating means, said picture generating means generates a picture of a reference line which shows that said three-dimensional virtual object is grasped along the image pickup direction of said image pickup means, and generates a picture that the picture of said three-dimensional virtual object moves on said reference plane under a state that the point of said reference line is in contact therewith in accordance with the operation of said operating means.

5. An apparatus for displaying a three-dimensional virtual object according to claim 1, wherein a common picture of a three-dimensional virtual object generated by said picture generating means is displayed on a plurality sets of display apparatus each composed at least of said display means, said image pickup means, said coordinates measuring means and said operating means, and positional change on said reference plane of said three-dimensional virtual object caused by the operation performed by said operating means for said three-dimensional virtual object is reflected in respective display apparatus.

6. A method of displaying a three-dimensional virtual object in an apparatus for displaying a three-dimensional virtual object provided with display means for displaying a predetermined picture and an image pickup means installed with the image pickup direction set to a back direction of a display plane of said display means for picking up an image of an actual picture of a predetermined subject, comprising the steps of:

coordinates measurement processing for measuring three-dimensional space coordinates of said image pickup means for a predetermined reference plane;

picture generation processing for generating a picture of a predetermined virtual three-dimensional object based on measured three-dimensional space coordinates for said reference plane of said image pickup means; and image composition processing for generating a composite picture in which a picture of a virtual three-dimensional object generated by said picture generation processing is superimposed on a predetermined position of said background is generated with said actual picture the image of which has been picked up as the background based on said three-dimensional space coordinates for said reference plane of said image pickup means measured by said coordinates measurement processing, and said composite picture is displayed on the display plane of said display means.

* * * * *